D. W. CARR.
ADJUSTABLE REAMER.
APPLICATION FILED MAR. 27, 1919.
1,359,963.
Patented Nov. 23, 1920.
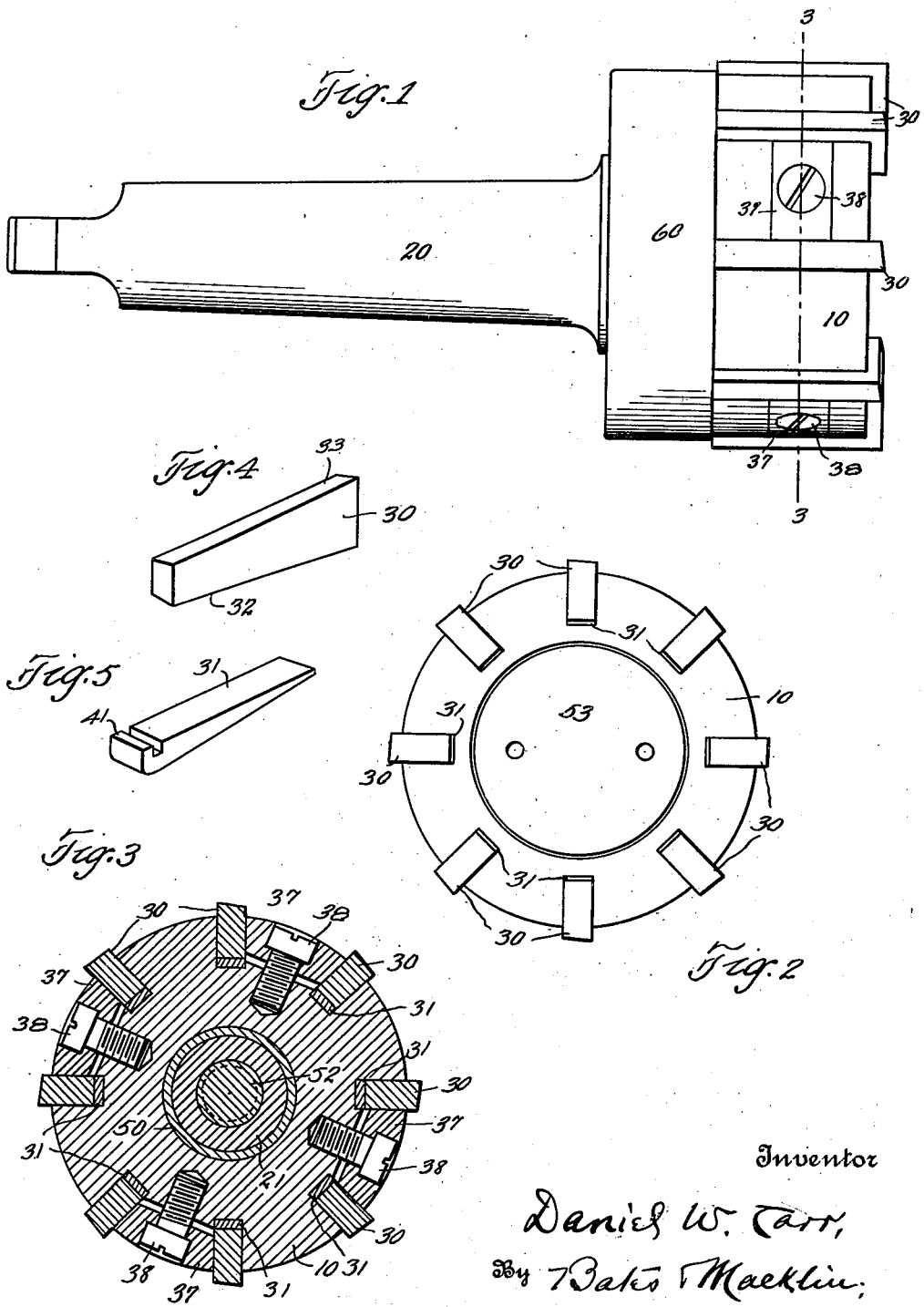

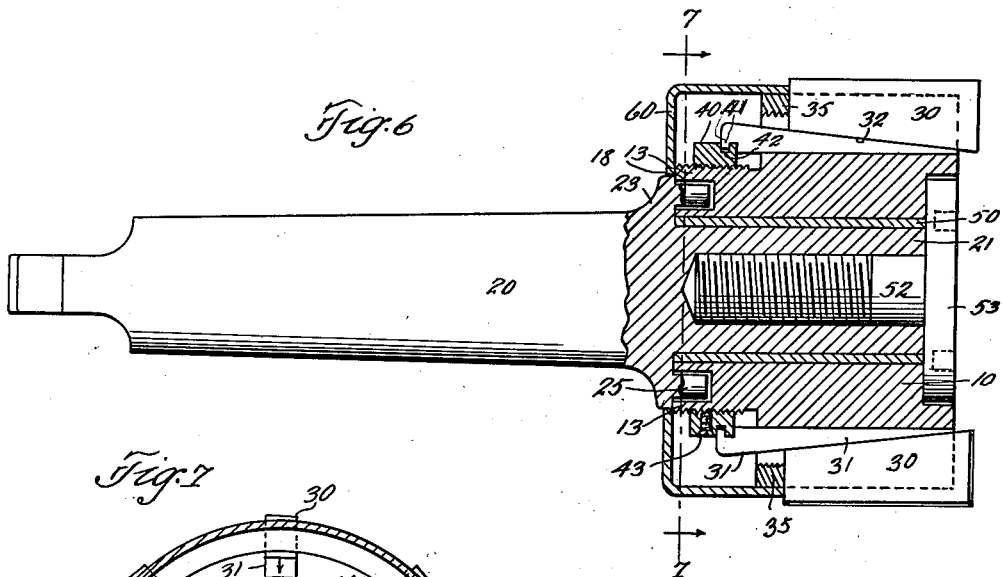
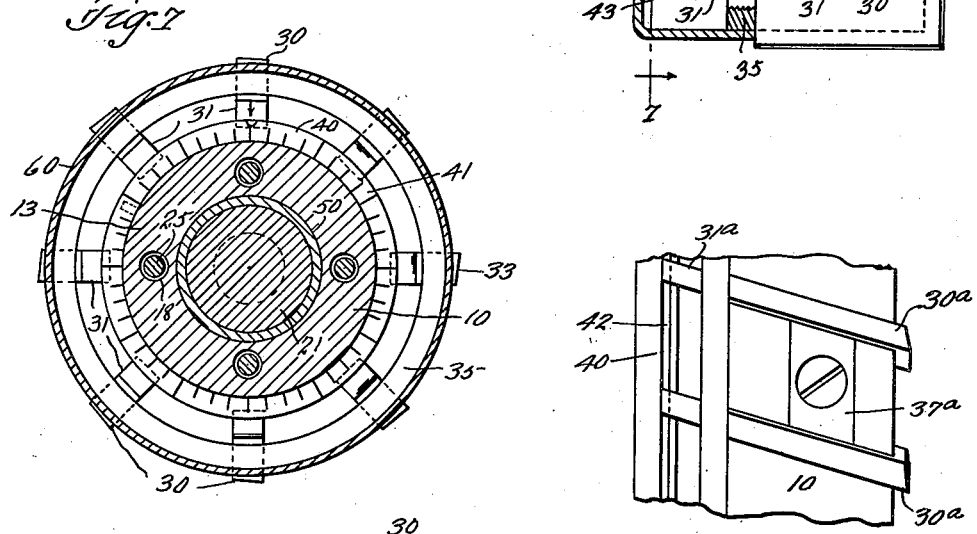
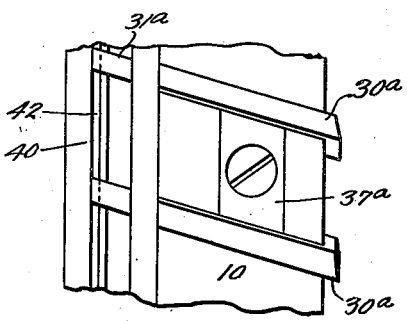
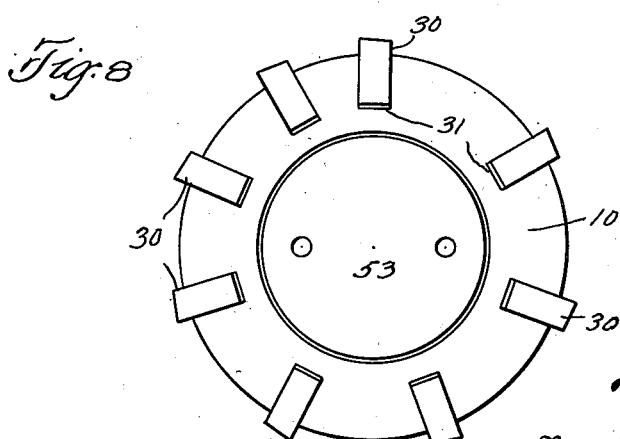

UNITED STATES PATENT OFFICE.

DANIEL W. CARR, OF LAKEWOOD, OHIO.

ADJUSTABLE REAMER.

1,359,963.    Specification of Letters Patent.    Patented Nov. 23, 1920.

Application filed March 27, 1919. Serial No. 285,421.

*To all whom it may concern:*

Be it known that I, DANIEL W. CARR, a citizen of the United States, residing at Lakewood, in the county of Cuyahoga and State of Ohio, have invented a certain new and useful Improvement in Adjustable Reamers, of which the following is a full, clear, and exact description, reference being had to the accompanying drawings.

This invention relates to reaming tools having adjustably positioned cutting blades. The primary object is to provide a simple effective structure for holding the blades accurately in position and allowing their ready adjustment for different bores. Another object is to arrange the tool so that it may be rigid or floating, as desired. Another object is to provide for the convenient sharpening of the tool. Other more specific objects will become apparent from the detailed description hereinafter given.

My reamer comprises a suitable head carrying individual cutting blades positioned by means of wedges and an adjusting device for simultaneously adjusting the various wedges. It includes also the more specific embodiment of such general combination as illustrated in the drawings and hereinafter explained.

In the drawings, Figure 1 is a side elevation of my reamer; Fig. 2 is an end view thereof; Fig. 3 is a cross section, as indicated by the line 3—3 on Fig. 1; Fig. 4 is a perspective of one of the cutting blades; Fig. 5 is a perspective of one of the positioning wedges; Fig. 6 is an axial section of the reamer; Fig. 7 is a cross section on the line 7—7 of Fig. 6; Fig. 8 is an end view of the reamer illustrating an unequal placing of the blades; Fig. 9 is a fragmentary side elevation illustrating the use of diagonal blades.

The body of the reamer comprises a suitable head 10 carrying the blades and their adjusting devices. This head is supported either rigidly or loosely by a shank which may drive the reamer or hold it stationary according to whether the tool or the work revolves.

The head is an annular cylindrical member having formed in it a series of grooves which are occupied by cutting blades 30 and by wedges 31 backing up the blades. As illustrated by all the figures except Fig. 9, the grooves are radial. They may be equidistant about the head or placed varying distances, as illustrated in Fig. 8. In Fig. 9 the grooves are diagonal to accommodate diagonal blades 30ª.

The blades 30 are of an approximately rectangular form but are inclined longitudinally on their inner faces, as shown at 32 and are slightly beveled transversely on their outer edges to make a sharp cutting edge, as indicated at 33. The inner ends of the blades abut a suitable stop carried by the reamer head, this stop being preferably a ring 35 internally threaded and screwing onto an externally threaded reduced portion of the head. The blades resting on the wedges and abutting against the abutment ring are clamped in place by the plugs 37 which lie in recesses in the head and are clamped to it by screws 38. There are half as many of these plugs as there are blades, and each plug abuts the adjacent side face of two blades as shown in Fig. 3. Clearance is provided at the base of the plug, and the plug has inclined ends so that when the screw is turned in the plug wedges tightly against the blades and thus locks them in position. In the construction of Fig. 9 the plug designated 37ª has its ends inclined corresponding to the diagonal direction of the blades.

The wedges 31 are formed with flat inner faces and longitudinal inclines on their outer faces, as shown in Fig. 6. They occupy the innermost portion of the grooves in the head and extend inwardly beyond the main portion of the head and lie outside of a hub 13 on this head. This hub is externally threaded, and mounted on this thread is a ring 40 which has on its outer face an annular peripheral groove 42 occupied by lips 41 on the ends of the wedges. The lips are provided by transversely grooving the wedges, as shown.

It follows from the construction just described that if the ring 40 be turned on its axis it will move longitudinally by reason of the screw thread and will thus adjust the wedges in or out, thereby forcing out the blades or allowing them to move inwardly. In performing the adjustment the screws 38 are slightly loosened to enable the blades to slide with a sufficient freedom. Then the ring is adjusted as desired and locked by a suitable set-screw 43 and the screws 38 are tightened, locking the blades in place. A suitable graduation on the ring 40 and coöperating with a mark on a part with reference to which the ring moves indicates accurately the adjustment given to the blades. Spanner notches may be provided in the ring, enabling it to be readily turned. If the blades are diagonal, as shown in Fig. 9, the wedges 31ª are correspondingly diagonal and the lips are at an angle to the length of the wedge to enable them to all stand in the plane of the groove 42. The unequal spacing of the blades as indicated in Fig. 8 prevents chattering of the reamer and may be employed whenever desired.

The shank 20 is adapted to be connected with the head 10, either rigidly or in a manner to allow the head 10 considerable movement so that it may float and adapt itself to a misalinement of the article bored with the axis of the reamer. To accomplish this, I provide an extension 21 on the shank which fits loosely within the head, and in the annular space between the extension and head I provide a bushing 50. A screw 52, having a flange 53, screws into a threaded bore in the extension and by reason of the flange overlapping the body 10, the shank and body are secured together against separation. If the bushing is present, the structure is rigidly connected together. If the bushing is absent, the head may have some movement with reference to the shank, whereby the floating effect desired is obtained.

The head is driven by the shank by means of pins 25 on the shank which extend into holes 18 in the head, which are larger than the pins and which the pins loosely occupy. If the bushing 50 is present the looseness between the pins 25 and the sockets 18, is immaterial. If the bushing is absent, this provides for the desired loose play.

60 indicates a dust cap mounted on a flange 23 on the shank and extending over the nut 40 and the ends of the wedges 31 and over the nut 35. This dust cap makes a sufficiently tight connection with the flange 23 so that it remains thereon in the ordinary operation, but may be removed whenever desired to adjust the position of the nut 40.

It will be seen from the description given that my reamer is simple in construction, may be either floating or rigid as desired, and allows the blades to be readily adjusted for different diameters within the range of the reamer. The blades may be readily adjusted by the means described within a thousandth of an inch, and the adjustment indicated by graduations on the nut 40.

When it is desired to grind the blades, this may be readily accomplished by removing the screw 52 and taking the head off the shank and mounting the head on a tapered arbor which may tightly hold it, and mounting the arbor in a suitable grinding device.

I claim:

1. The combination of a shank having an extension, a head surrounding the shank and carrying cutting blades, means embodying a floating connection between the shank and head whereby the head may be driven by the shank, and a removable bushing adapted to surround the extension and substantially fill the space between it and the bore of the head whereby the floating connection may be transformed into a rigid connection between the shank and head.

2. The combination of a shank having an extension, a head surrounding the shank and carrying cutting blades, a removable bushing adapted to surround the extension and substantially fill the space between it and the bore of the head, and a threaded member engaging the end of the extension and having a flange overlapping the bushing and the blade-carrying head whereby the head may be either rigidly or loosely held.

In testimony whereof, I hereunto affix my signature.

DANIEL W. CARR.